L. E. TYGERT.
FLOWER STEMMING DEVICE.
APPLICATION FILED SEPT. 8, 1911.
1,026,969.
Patented May 21, 1912.
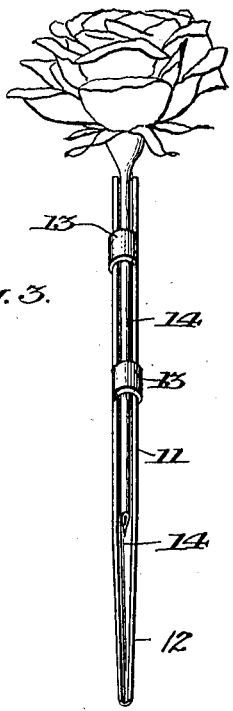
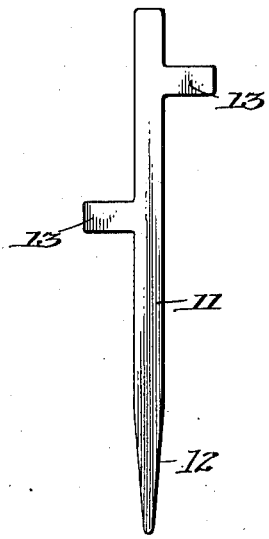
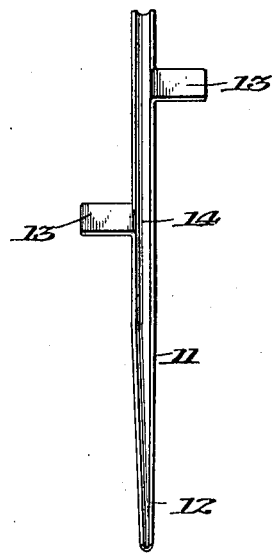
Witnesses:
Inventor:

UNITED STATES PATENT OFFICE.

LAURA E. TYGERT, OF ALBANY, NEW YORK.

FLOWER-STEMMING DEVICE.

1,026,969.  Specification of Letters Patent.  Patented May 21, 1912.

Application filed September 8, 1911. Serial No. 648,309.

*To all whom it may concern:*

Be it known that I, LAURA E. TYGERT, a citizen of the United States, and resident of the city and county of Albany, New York, have invented certain new and useful Improvements in Flower-Stemming Devices, of which the following is a specification.

My invention relates to means for supplying or reinforcing the stems of flowers, foliage or the like, so as to enable them to be conveniently and advantageously used by florists in producing certain well-known and desired effects. In making "set pieces," or designs, the florist fills a suitably shaped wire frame with a mass of sponge-like material, as sphagnum or other moss. He then secures to the stem or calyx of each flower, leaf or tuft of foliage to be used a rigid longitudinal reinforcement or extension, preferably having a pointed lower end, which end is thrust into the previously dampened moss so as to support the flower or the like and to bring the end of its short stem into contact therewith, whereby it is supplied with moisture. The means heretofore employed has usually been a wooden tooth-pick bound to the stem or calyx by a short piece of iron wire. So in making bouquets, the lower ends of which were to be covered with paper or foil, stiff broom-straws or various slender twigs were in like manner tied by wires to the stems of the flowers or foliage. This tying or binding operation is very objectionable, as being tedious and time-wasting, and as causing much pain and annoyance to the workers, whose fingers are continually pricked by the rough ends of the fine wires employed.

The object of my invention is to provide, as a new article of manufacture, a flower stemming device complete in itself, made from an integral blank of sheet metal, having a rigid body and one or more flexible transverse portions for embracing the stem or calyx of a flower or leaf, such device being simple, economical, quickly applied and operative to firmly hold the flower or the like without cutting or breaking its stem.

Another object of my invention is to protect the end of the flower stem and to guide it down into the dampened moss so that it may be supplied with moisture.

In the drawings, which show a preferred form of my device, Figure 1 is an elevation of a metal blank, showing the result of the first operation in making the device; Fig. 2 is a like view of the completed article; Fig. 3 shows its operation.

11 designates the stem or body portion of the device formed with a pointed lower end 12. Projecting laterally from the stem portion 12 at opposite sides thereof and spaced apart from each other are two wings 13. A deep longitudinal groove 14 extends the entire length of the body 11, including the pointed end 12.

It will be understood that the device is made from thin metal, as taggers or light tin plate, so that the wings 13, which may be one or more in number, are readily bent forward and around the stem of the flower or leaf, while the body or longitudinal portion 11—12 is stiffened and made sufficiently rigid to be forced down into the packed moss without bending by means of the groove 14. This groove also serves to inclose to a greater or less extent the stem, and to insure that its end is not bent upward, but passes down into the wet sphagnum or the like. If desired, the blanks after stamping may be japanned, which will serve to cover the sharp edges of the metal thereby saving the fingers of the operator, besides preventing rusting.

It will be understood that my invention may be embodied in forms other than those shown, and that many mechanical alterations may be made in the shapes and sizes of the various parts as convenience may dictate. I do not, therefore, consider myself limited as to the scope of my invention except by the appended claims.

What I claim is:

1. A flower stemming device formed from an integral sheet metal blank comprising a stem portion having a longitudinal groove extending substantially its entire length, and a flat transverse portion near the upper end of said stem portion and adapted to embrace the stem or calyx of a flower.

2. A flower stemming device formed from an integral sheet metal blank comprising a stem portion having a longitudinal groove extending substantially its entire length, and a plurality of flat transverse portions near the upper end of said stem portion, on opposite sides thereof and spaced apart from each other, said transverse portions being adapted to embrace the stem or calyx of a flower.

LAURA E. TYGERT.

Witnesses:
 JENNIE A. NELSON,
 GEO. L. COOPER.